April 3, 1934.  H. THOMPSON  1,953,278

TIRE RIM

Filed Sept. 23, 1933  3 Sheets-Sheet 1

Inventor

Henry Thompson

By *Clarence A. O'Brien*

Attorney

April 3, 1934.  H. THOMPSON  1,953,278
TIRE RIM
Filed Sept. 23, 1933  3 Sheets-Sheet 2
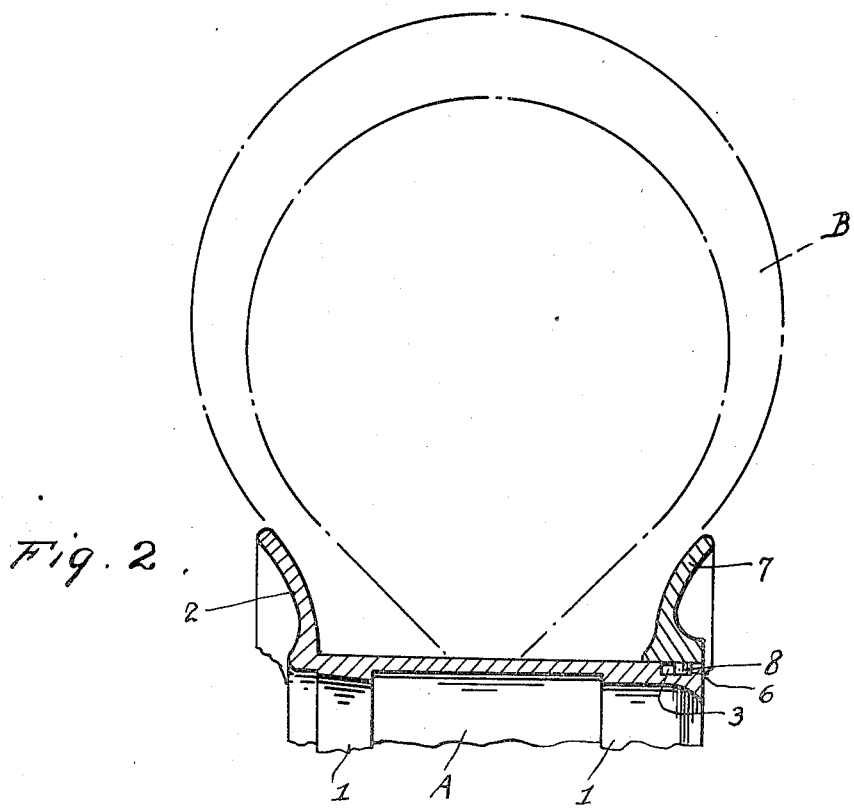
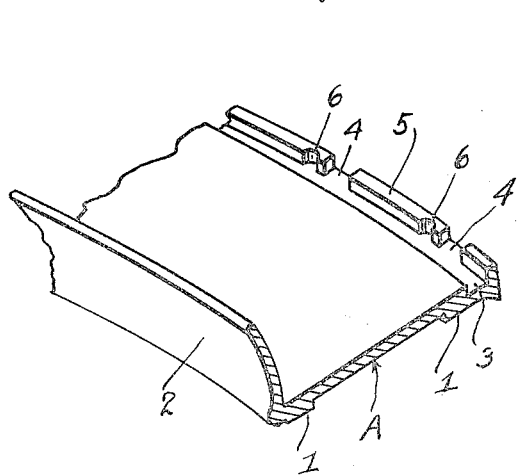
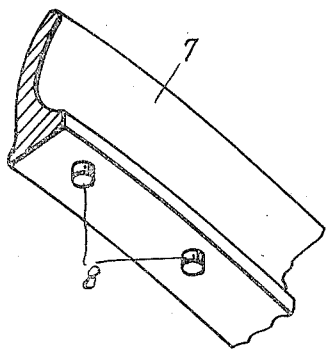
Inventor
Henry Thompson
By Clarence A. O'Brien
Attorney April 3, 1934.   H. THOMPSON   1,953,278
TIRE RIM
Filed Sept. 23, 1933   3 Sheets-Sheet 3
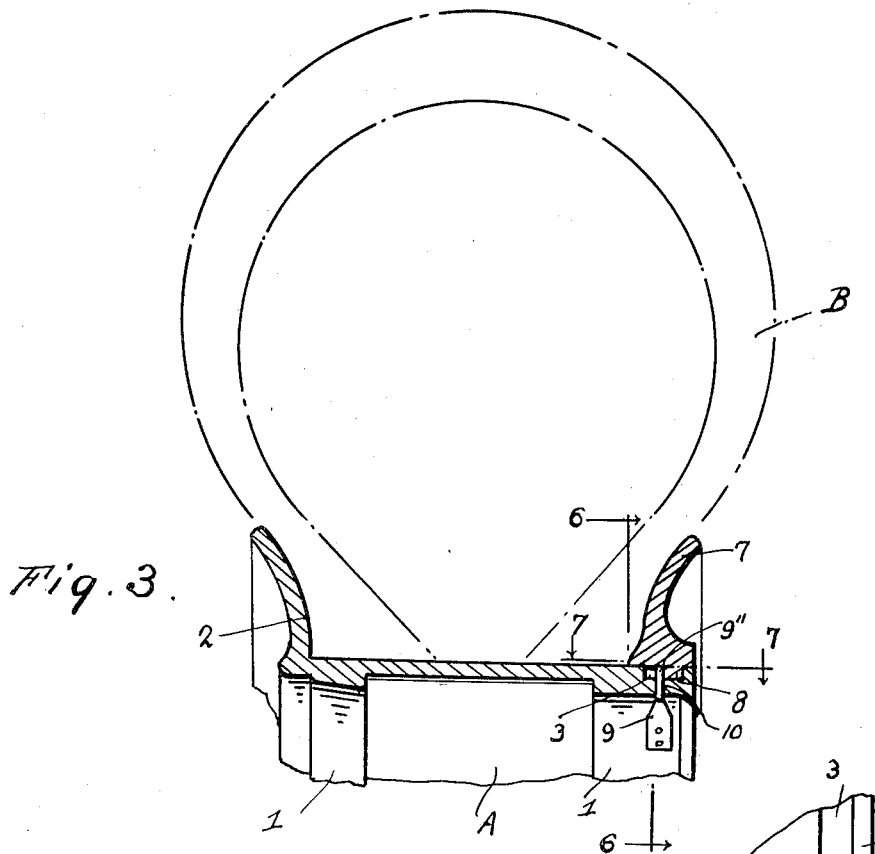
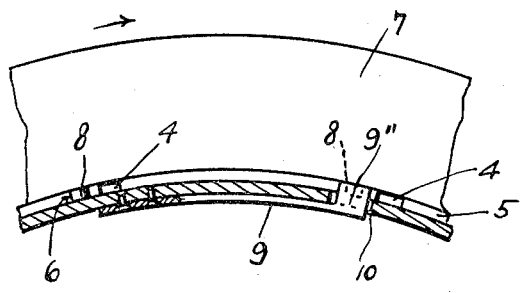
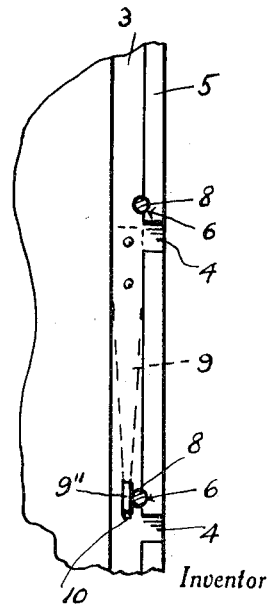
Inventor
Henry Thompson
By Clarence A. O'Brien
Attorney Patented Apr. 3, 1934

1,953,278

UNITED STATES PATENT OFFICE 1,953,278

TIRE RIM

Henry Thompson, Centralia, Wash.

Application September 23, 1933, Serial No. 690,729

1 Claim. (Cl. 152—21)

This invention relates to a tire rim, the general object of the invention being to provide a self-locking ring or flange for the rim whereby a tire can be easily and quickly placed on the rim or removed therefrom, with means whereby the ring or flange locks itself in place under the action of the tire.

Another object of the invention is to provide means whereby the flange or ring can be placed in position and removed without the necessity of hammering or prying loose the parts, including the tire, which often injures the rim and the tire.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 2 is a transverse sectional view through the rim, with the tire shown in dotted lines.

Figure 3 is a similar view, with the section passing through a part of the rim to show the locking member.

Figure 4 is a perspective view of a portion of the rim, with the ring removed.

Figure 5 is a similar view of the ring.

Figure 6 is a section on line 6—6 of Figure 3.

Figure 7 is a section on line 7—7 of Figure 3.

Figure 1:
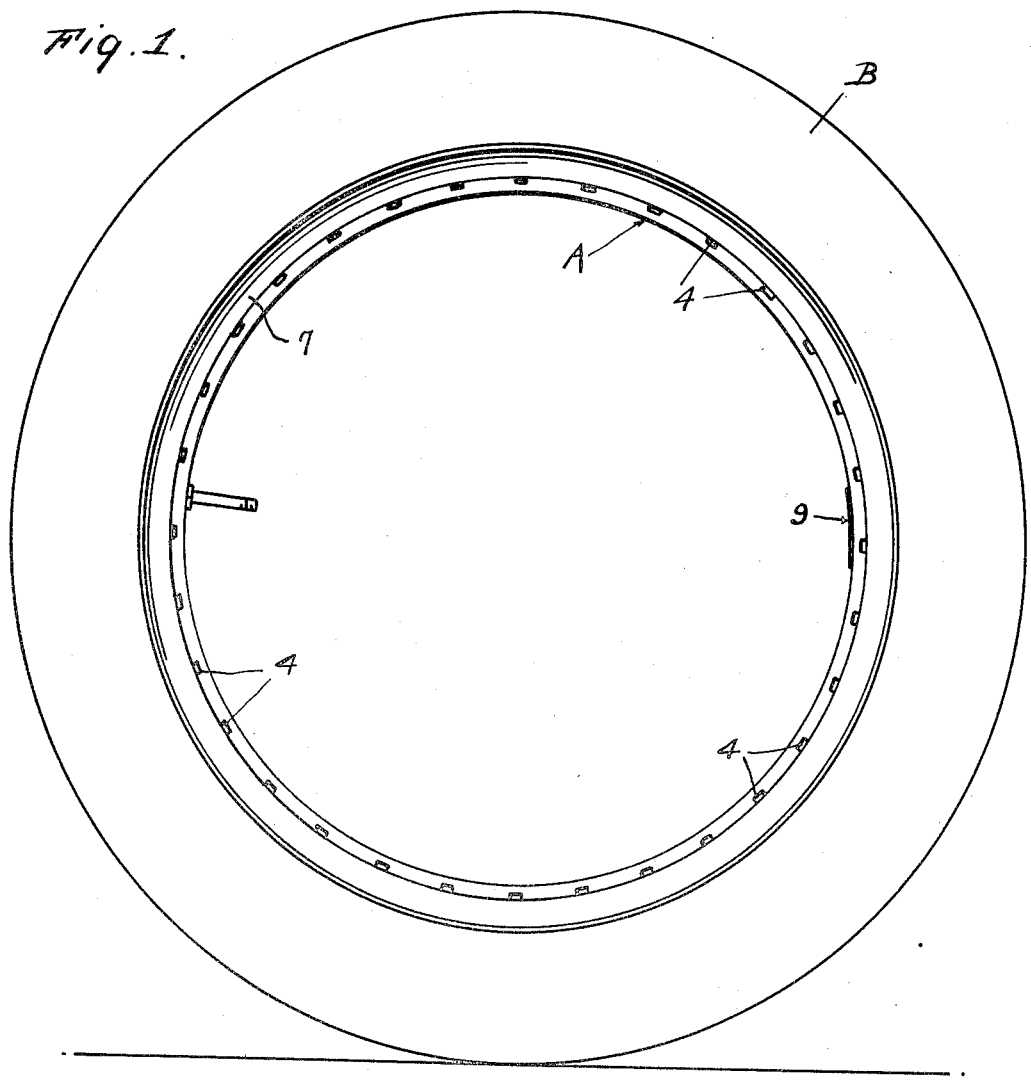
Figure 1 is an elevation of the improved rim, showing a tire thereon.

In these drawings, the letter A indicates the rim which is provided with the thickened parts 1 on its inner circumference adjacent the edges thereof, and the numeral 2 indicates the stationary inner flange for holding the inner bead of the tire B in place. The outer circumference of the rim, adjacent its outer edge, is formed with a groove 3 and the outer edge is formed with the notches 4 which communicate with the groove and the solid portions 5 between the notches are formed with the recesses 6 adjacent their front ends or the ends lying closest to the notches. The outer flange or ring 7 is detachable and its inner edge is formed with a plurality of lugs 8 which are adapted to pass through the notches 4 and then by partly rotating the ring 7, the lugs will be moved into those portions of the groove 3, the outer walls of which are formed by the solid portions 5. The ring is then forced outwardly by the tire so that the lugs will engage the recesses 6 and thus the ring 7 will be locked in place.

Figure 8:
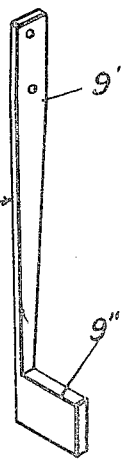
Figure 8 is a view of the latch member.
Figure 9:
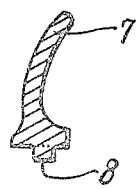
Figure 9 is a sectional view through the ring.

I also provide one or more latch members 9, said latch member including an elongated shank 9' and a head 9", as shown in Figure 8, the free end of the shank being fastened to a part of the inner circumference of the rim, with the head adapted to pass through a hole 10 in the rim which communicates with the groove 3 adjacent one of the recesses 6, so that the spring latch, when in operative position, will hold a lug 8 in said recess, as shown in Figures 6 and 7. As many of these latch members can be used as desired though Figure 1 shows but one latch member, and this is preferably arranged opposite the stem receiving hole of the rim.

Thus it will be seen that I have provided simple means for removing and replacing the outer flange or ring of the rim so that the tire can be easily placed on the rim and removed therefrom by first pushing the ring inwardly to place the lugs in the groove, then partly turning the ring to place the lugs opposite the recesses 6, after which the tire will force the ring outwardly to place the lugs in the recesses. As soon as the latch member is released, it will move into the position shown in Figures 6 and 7, so as to hold one of the lugs in the recess.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

A rim of the class described comprising a rim portion, a stationary flange at one edge thereof, said rim portion having an annular groove therein adjacent the other edge, and spaced notches leading from the exterior edge of the rim portion into said groove, a removable flange or ring having lugs on its inner edge for passing through the notches into the groove, after which the ring or flange is partly rotated to bring the lugs opposite unnotched portions of the rim portion, said unnotched portions having recesses on their inner edges for receiving the lugs, said rim portion having an opening therein extending from its inner face through the bottom of the groove and located adjacent to one of the recesses, and a latch member including a shank and a head, the shank being fastened to the inner face of the rim portion, with the head passing through said opening and engaging the lug located in the last mentioned recess for holding the lug in said recess.

HENRY THOMPSON.